US006946965B2

(12) United States Patent
Young et al.

(10) Patent No.: US 6,946,965 B2
(45) Date of Patent: Sep. 20, 2005

(54) DRIVER FATIGUE DETECTOR WITH AUTOMATIC DEACTIVATION

(76) Inventors: Thomas W. Young, 729 Brown Church Rd., Jackson, TN (US) 38302; Frazier R. Thompson, 2379 Cherry Spring Cove, Cordova, TN (US) 38016

(*) Notice: Subject to any disclaimer, the term of this patent is extended or adjusted under 35 U.S.C. 154(b) by 0 days.

(21) Appl. No.: 10/330,330

(22) Filed: Dec. 30, 2002

(65) Prior Publication Data

US 2004/0124985 A1 Jul. 1, 2004

(51) Int. Cl.[7] .................................................. G08B 23/00
(52) U.S. Cl. ....................................... 340/575; 340/439
(58) Field of Search ................................ 340/439, 576, 340/457, 575; 368/109, 250, 263; 701/70

(56) References Cited

U.S. PATENT DOCUMENTS 3,106,981 A * 10/1963 Chakiris ..................... 180/272
3,718,921 A * 2/1973 Johnson ...................... 180/272
4,005,398 A * 1/1977 Inoue et al. ................ 180/272
4,278,969 A * 7/1981 Woods ....................... 340/576
4,463,347 A * 7/1984 Seko et al. ................. 340/576
4,502,122 A * 2/1985 Yanagishima et al. ....... 340/575
4,679,648 A * 7/1987 Johansen .................... 180/272
5,012,226 A 4/1991 Love
5,402,108 A 3/1995 Tabin et al.
5,559,495 A * 9/1996 Cochran ..................... 340/457
5,675,313 A * 10/1997 Keluskar ................. 340/425.5
5,684,455 A * 11/1997 Williams et al. ............ 340/439
5,745,031 A * 4/1998 Yamamoto .................. 340/439
5,942,979 A * 8/1999 Luppino ..................... 340/576
5,952,928 A 9/1999 Washington et al.
6,023,227 A * 2/2000 Yanko et al. ............... 340/576
6,426,702 B1 * 7/2002 Young et al. ............... 340/576
6,590,499 B1 * 7/2003 D'Agosto ................... 340/575

* cited by examiner

*Primary Examiner*—Jeffery Hofsass
*Assistant Examiner*—Eric Blount
(74) *Attorney, Agent, or Firm*—Stites & Harbison PLLC; Ross F. Hunt, Jr.

(57) ABSTRACT

A device is provided for alerting a driver of an automotive vehicle as to the onset of fatigue, characterized by eyelid droop, head droop and a like condition wherein the eyes of the driver are not directed straight ahead onto the road. The device includes an indicator light, preferably an LED, which is viewable by the driver in the upper periphery of the field of vision of the driver. A control circuit controls the LED so as to provide illumination thereof after a predetermined time interval. A reset pushbutton, when depressed, provides resetting of the time interval. An alarm sounds when the LED has been illuminated after the passage of the predetermined time interval. The device is automatically deactivated (or, reset) when, e.g., the brakes are applied or the engine speed drops to a low value. The device is automatically activated when the engine is turned on or, e.g., when the vehicle speed or other parameter reaches a predetermined value.

14 Claims, 2 Drawing Sheets

DRIVER FATIGUE DETECTOR WITH AUTOMATIC DEACTIVATION

FIELD OF THE INVENTION

The present invention generally relates to devices for warning a driver of a vehicle of potentially dangerous situations involving the ability of the driver to operate the vehicle and, more particularly, to a driver warning device for detecting symptoms of, and warning the driver of, the onset of fatigue or drowsiness.

BACKGROUND OF THE INVENTION

Accidents commonly happen as the result of driver inattention resulting from fatigue or drowsiness. A majority of automobile accidents caused by such fatigue or drowsiness are motor vehicle (e.g., truck and automobile) collisions on interstate or other highways where, for example, monotonous road and scenery conditions promote "highway hypnotism" and attendant driver fatigue and/or drowsiness.

Devices have been developed which sound an alarm to alert the driver when the driver has dozed off but which do not test the current driving ability of the driver and thus are of limited value in many potentially dangerous situations. Other devices do test the driver but suffer other shortcomings. The latter category includes devices such as those described in U.S. Pat. No. 5,684,455 to Williams et al and U.S. Pat. No. 5,402,108 to Tabin et al. The Williams et al patent discloses a driver alerting device comprising green, yellow and red indicator lights, a timer, a resetting mechanism and an audible alarm. The driver is required to reset the device after the illumination of the green light. If the device is not reset before a first timed period has elapsed, the yellow light then illuminates and flashes for a second timed period. If the device is not reset before the second timed period has elapsed, the red light then illuminates and flashes, and the audible alarm sounds until the device is reset. The Tabin et al patent discloses a driver alerting device including a red indicator light, a timer, a resetting mechanism and an audible alarm. The driver is required to reset the device within a timed period after the red indicator light illuminates and begins flashing. If the driver does not reset the device before the timed period has elapsed, the audible alarm then sounds. Other patents of interest in this field include U.S. Pat. No. 5,012,226 to Love and U.S. Pat. No. 5,952,928 to Washington et al.

In our earlier U.S. Pat. No. 6,426,702, we disclose a driver fatigue detector which tests a driver for the onset of fatigue and/or drowsiness and, more particularly, tests the driver as to whether the eyes of the driver are properly focussed on the road ahead. The device of our patent interrupts periods of fatigue or drowsiness by causing the driver to respond or be warned. The device will reduce or eliminate accidents attributable to the phenomenon of "highway hypnotism" described above, will reduce such accidents such as rear-end collisions and potentially dangerous situations occurring in the traffic lane and on the side of the road, running off the road, crossing the center line or median, sideswiping moving or parked vehicles, running red lights or stop signs, loss of control or rollovers due to evasive maneuvers, and rollovers or like accidents at exit ramps caused by fast last minute turns caused by the inattention of the driver in noting a desired exit in time to slow down.

The device of our prior patent is concerned with alerting a driver of an automotive vehicle as to the onset of fatigue, characterized by eyelid droop, head droop and a like condition wherein the eyes of a driver are not directed straight ahead onto the road, and comprises, inter alia, a housing or case adapted to be affixed to a portion of the automotive vehicle so as to be located at the upper periphery of the field of vision of the driver, the housing including an indicator lamp viewable by the driver in the upper periphery of the field of vision of the driver, an electrical control circuit for controlling illumination of the indicator lamp so as to provide illumination thereof after passage of a predetermined time interval, a driver controlled reset switch for providing resetting of the time interval upon depression of the reset switch by the driver, and alarm means for producing an alarm signal when the indicator lamp has been illuminated after the passage of said predetermined time interval and the reset switch has not been depressed after passage of a further predetermined time period.

As described in our prior patent, the driver also has the option to turn the device off when, for example, the driver is in heavy city traffic or any other time that the driver can be certain that fatigue or drowsiness will not set in, thereby preventing the device from being a nuisance when not required.

SUMMARY OF THE INVENTION

In accordance with the invention, a driver warning device is provided which is particularly adapted to "commercial" applications, i.e., applications wherein the device is installed and controlled by a company or other entity that employs the driver, in contrast to "personal" applications wherein the device is basically designed for the personal use of a driver, and is, in particular, designed to be under the personal control of the driver so that turning off or deactivation of the device is at the option of the driver, as described above. It will be understood that there is often general resistance by employee-drivers to using a device of this type, and that where turning off of the device is at the option of the driver, there will be abuses by some drivers. On the other hand, the astute employer will certainly recognize that there are situations (e.g., heavy city traffic as mentioned above) wherein the device should not be needed and will, with some justification, be considered something of a nuisance. The present invention addresses both of these issues.

In accordance with an important embodiment, deactivation of the device or system is triggered automatically when a predetermined vehicle operation parameter is detected, e.g., when the vehicle brakes are used, when low vehicle speeds are detected, when the r.p.m. of the drive shaft drops to below a predetermined level or a characteristic state or value of another vehicle parameter is detected.

Preferably, the device of the invention is turned on, i.e., power is supplied thereto, when the vehicle engine is started by the ignition switch and remains on until the ignition switch is turned off. This is in contrast to the "personal" device of our earlier patent wherein an off-on switch, controlled by the driver, is provided. However, in accordance with one important embodiment, activation of the other indicator or warning lamp does not occur until a particular vehicle operation parameter is sensed, e.g., where the vehicle reaches a predetermined speed, where the driver actuates the vehicle cruise control or where a predetermined speed is maintained for a predetermined period of time. This feature helps ensure that the device is activated only in situations where the device is clearly useful.

On the other hand, in accordance with a further important embodiment, the device remains constantly "on" or active after being initially activated and is deactivated in the situations mentioned above and described below so as to ensure that the device is not an annoyance.

In accordance with a further important feature of the invention, the alarm circuit is incorporated in an earpiece, headphones or like private listening device. This embodiment, enables the use of more alarm capability (i.e., a louder alarm signal) than would normally be used, e.g., where the driver is a tour bus driver, a long distance taxi driver or the like, and the audio alarms would be of considerable concern to the passengers or where the ambient noise level is high (e.g., on a school bus). In an embodiment wherein an alarm is built into the vehicle, the built-in alarm circuit would be deactivated when the private listening device (e.g., ear-piece or headphones) is plugged in or otherwise activated.

The device of the present invention is installed on the vehicle, and, in one preferred embodiment, all parts thereof are permanently installed or built in. This is in contrast to the device shown in the drawings of our earlier patent wherein the entire unit is simply clipped on to a part of the vehicle such as a sun visor.

In further contrast with the device of our prior patent, the device is preferably powered by a vehicle power source such as the vehicle battery, and not by an "internal" battery housed with the other components or by a plug-in power source such as one adapted to be plugged into the cigarette lighter, as disclosed in our prior patent.

Although the complete device can be housed in a single unit built into the vehicle, certain parts thereof (e.g., the indicator lamp, the reset button or switch and the alarm portion) are advantageously located at separate locations in the vehicle.

In accordance with a first aspect of the invention, there is provided a device for alerting a driver of a motorized vehicle as to the onset of fatigue, characterized by eyelid droop, head droop and a like condition wherein the eyes of a driver are not directed straight ahead onto the road, the device comprising:

an indicator lamp affixed to a part of the vehicle located in the upper periphery of the field of vision of the driver, so as to be viewable by the driver in the upper periphery of the field of vision of the driver, an electrical control circuit for controlling illumination of said indicator lamp so as to provide illumination thereof after passage of a predetermined time interval, a driver controlled reset switch for providing resetting of said time interval upon depression thereof by the driver;

alarm means for producing an alarm signal when said indicator lamp has been illuminated after the passage of said predetermined time interval and said reset switch has not been depressed after passage of a further predetermined time period, and automatic control means for sensing a characteristic of a parameter related to vehicle operation and for preventing illumination of said indicator lamp by said control circuit responsive to sensing said characteristic.

In one embodiment, wherein the vehicle includes vehicle brakes having applied and non-applied braking states, the parameter is the braking state of the brakes and the characteristic is whether the brakes are in the applied state.

In another embodiment, the parameter is vehicle speed and the characteristic is whether the vehicle speed is below a predetermined speed.

In yet another embodiment, the parameter is driveshaft r.p.m. and the characteristic is whether the driveshaft r.p.m. is below a predetermined speed.

In an advantageous implementation, the device further comprises further automatic control means for sensing a characteristic of a parameter related to vehicle operation and for enabling illumination of said indicator lamp by the control circuit responsive to sensing said characteristic, i.e., for activating the device responsive to the characteristic being of a particular predetermined value or state.

In one embodiment of this implementation, the vehicle includes an ignition switch, the parameter comprises ignition switch state and said characteristic comprises whether the ignition switch is in the on or closed state.

In one further embodiment of this implementation, the parameter comprises vehicle cruise control status and the characteristic is whether the vehicle cruise control is in an actuated status.

In yet another embodiment of this implementation, the parameter comprises vehicle speed and the characteristic is whether the vehicle speed is above a predetermined speed.

Preferably, the further automatic control means also senses whether the vehicle speed has exceeded a predetermined speed for a predetermined time period and, if so, enables illumination of the indicator lamp by said control circuit.

In one advantageous embodiment, the indicator lamp comprises a light emitting diode, and the light emitting diode is affixed to a different part of the vehicle from said reset switch and said alarm means. Preferably, the reset switch and alarm means are also located at different parts of the vehicle.

In an important implementation, the device further comprises a wearable audio signal receiving device for receiving the alarm signal.

In accordance with a further aspect of the invention, there is provided a device for alerting a driver of a motorized vehicle to the onset of fatigue, the device comprising:

an indicator lamp affixed to a part of the vehicle located in the upper periphery of the field of vision of the driver, so as to be viewable by the driver in the upper periphery of the field of vision of the driver, an electrical control circuit for controlling illumination of said indicator lamp so as to provide illumination thereof after passage of a predetermined time interval, a driver controlled reset switch for providing resetting of said time interval upon depression thereof by the driver;

alarm means for producing an alarm signal when said indicator lamp has been illuminated after the passage of said predetermined time interval and said reset switch has not been depressed after passage of a further predetermined time period, automatic deactivation means for sensing a first characteristic of a first parameter related to vehicle operation and for deactivating said control circuit so as to prevent illumination of said indicator lamp by said control circuit responsive to sensing said characteristic; and automatic activation means for sensing a further characteristic of a parameter related to vehicle operation and for activating said control circuit so as to enable illumination of said indicator lamp by said control circuit responsive to sensing said further characteristic.

In one embodiment which is similar to that described above, the vehicle includes vehicle brakes having applied and non-applied braking states, the first parameter is the braking state of the brakes and the first characteristic is whether the brakes are in the applied state.

In another embodiment, the first parameter is vehicle speed and the first characteristic is whether the vehicle speed is below a predetermined speed.

In a further embodiment, the first parameter is driveshaft r.p.m. and the first characteristic is whether the driveshaft r.p.m. is below a predetermined speed.

In one embodiment, the further parameter comprises vehicle cruise control status and the further characteristic is whether the vehicle cruise is in an actuated status.

In another embodiment, the further parameter comprises vehicle speed and the further characteristic is whether the vehicle speed is above a predetermined speed.

Preferably, the automatic activation means also senses whether the vehicle speed has exceeded a predetermined speed for a predetermined time period and, if so, enables illumination of the indicator lamp by said control circuit.

In accordance with one preferred embodiment, the indicator lamp comprises a light emitting diode, and the light emitting diode is affixed to a different part of the vehicle from said reset switch and said alarm means. In an advantageous implementation, the reset switch and said alarm means are also located at different parts of the vehicle.

As above, in an important implementation of this aspect of the invention, the device further comprises a wearable audio signal receiving device for receiving said alarm signal.

Further features and advantages of the present invention will be set forth in, or apparent from, the detailed description of preferred embodiments thereof which follows.

DESCRIPTION OF THE PREFERRED EMBODIMENTS

As indicated above, the driver fatigue detector device of the present invention is similar in some ways to that of that disclosed in our earlier U.S. Pat. No. 6,426,702, which is hereby incorporated by reference, although, as set forth above, there are a number of important differences. Because the basic components are the same, the following description will mainly focus on the new features of the present invention.

Figure 1:
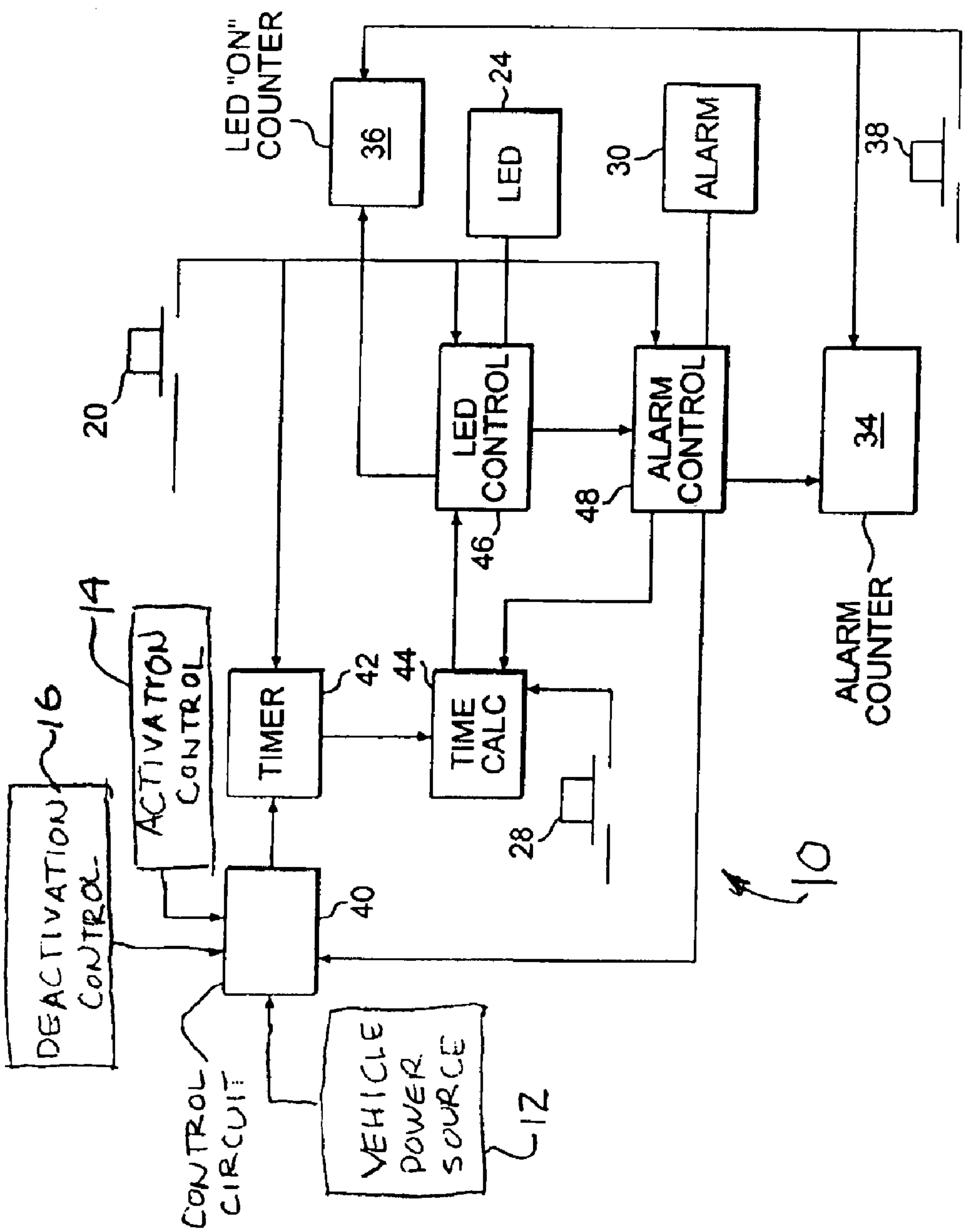
FIG. 1 is a block diagram of a driver fatigue detector device or system in accordance with a preferred embodiment of the invention.

Referring to FIG. 1, a block form schematic circuit diagram of the electronic indicator and control system of the invention is shown. The system, which is generally denoted 10, includes a control circuit 40 that receives input power from a vehicle power source 12 which, as described above, can be the vehicle battery. In a preferred embodiment, control circuit 40 provides power for the system when the vehicle is started by the ignition switch. This results in illumination of indicator light or lamp, indicated by LED 24, for a predetermined short time period, preferably 5–12 seconds, to verify the "power on" condition of the system. Preferably, the LED 24 provides a flashing red indication so as to get the attention of the driver. Further, the light produced by LED 24 should be visible in bright daylight but not so bright as to illuminate the area in which the driver should be looking and thus distract the driver (i.e., should not be so bright that it interferes with the driver's view through the windshield or such that the driver reacts strongly to the light and is diverted or distracted enough to impair his or her driving).

As illustrated in FIG. 1, LED 24 is connected to control circuit 40 through a timer or timing circuit 42, a time calculator circuit 44 and an LED control or firing control circuit 46. Activation of the time calculator circuit 44 is controlled by a push button switch 28 described in the above-mentioned patent and by an alarm control or firing control circuit 48. The timer or timing circuit 42 provides pulses to produce cycling of the time calculator circuit 44 and can be reset by push button reset switch 20. The time calculator circuit 44 calculates cycle minutes and resets seconds.

The LED control circuit 46 is connected to a LED "ON" counter 36 and to alarm control circuit 48 and both are connected to the push button control (reset) switch 20. The LED control circuit 46 activates LED 24 based on input signals from the time calculation circuit. The alarm control or firing control 48 activates an audio alarm or alarm unit 30 if activation (lighting) of the LED 24 is not acknowledged when activated, i.e., if the reset push button 20 has not been depressed.

An alarm counter 34 counts and displays the number of times that the alarm circuit has been activated since the last time the device has been reset, and a reset button 38 is provided which is used to reset counter units 34 and 36.

Apart from the vehicle power source 12, the system of FIG. 1 as just described is similar to that of the aforementioned U.S. Pat. No. 6,426,702. In accordance with one aspect of the invention, the user-actuated control switch of our prior patent is replaced with an automatic activation control unit 14 and an automatic deactivation control unit 16.

As discussed above, the activation control unit 14 can simply be a switch which is closed when the ignition switch is closed and is opened with the ignition switch is opened so that the system 10 of FIG. 1 is activated continuously during the time period when the ignition is turned on and off. Alternatively, as was also described above, activation of control unit 14 can comprise a detector or sensor (not shown) which senses a vehicle operating parameter or parameters and which provides turning on of the system 10 only when a predetermined state or level of the parameter or parameters is sensed. For example, activation of the system can be controlled based on a characteristic of such parameters as vehicle speed and actuation of vehicle cruise control, i.e., based on whether the vehicle speed exceeds a predetermined level or exceeds a predetermined level for a predetermined time, or whether the vehicle cruise is on. In general, the system of the invention is most useful in highway driving situations where the vehicle is operated at relatively high speeds. It will, of course, be understood that the vehicle cruise control is normally only actuated in such situations, i.e., where the driver anticipates driving at relatively high speed for an extended period of time.

In accordance with a further important feature of the invention, deactivating of the system is controlled by the deactivation control unit 16, based on sensing of a predetermined characteristic of an engine operating parameter. Thus, even in a situation where the system 10 is continuously activated, the control unit 16, in effect, serves as an override function to deactivate or disable the control circuit 40 and thus preclude illumination of the LED 24. For example, in one implementation, the parameter sensed is brake operation and the circuit or system 10 is deactivated when the brakes are applied or are applied a predetermined number of times during a predetermined period. It will be appreciated that a number of different approaches can be taken in sensing whether or not the brakes have been applied. In another example, the sensed parameter is vehicle speed (or driveshaft r.p.m.), and the circuit or system 10 is deactivated when the vehicle speed (or the driveshaft r.p.m.) drops below a predetermined value. Again, vehicle speed or driveshaft r.p.m. is quite easy to determine using circuitry which is already a standard part of the vehicle electrical system or, depending on the application, using a separate tachometer or other speed detecting device. This feature of the invention ensures that the LED 24 is off and thus the alarm 30 is off in situations such as those involving low vehicle speeds. In this regard, it is considered that the device 10 is less useful in such situations, it being assumed that a driver is less likely to fall asleep at the wheel in low speed driving situations where the brakes are being applied often.

Figure 2:
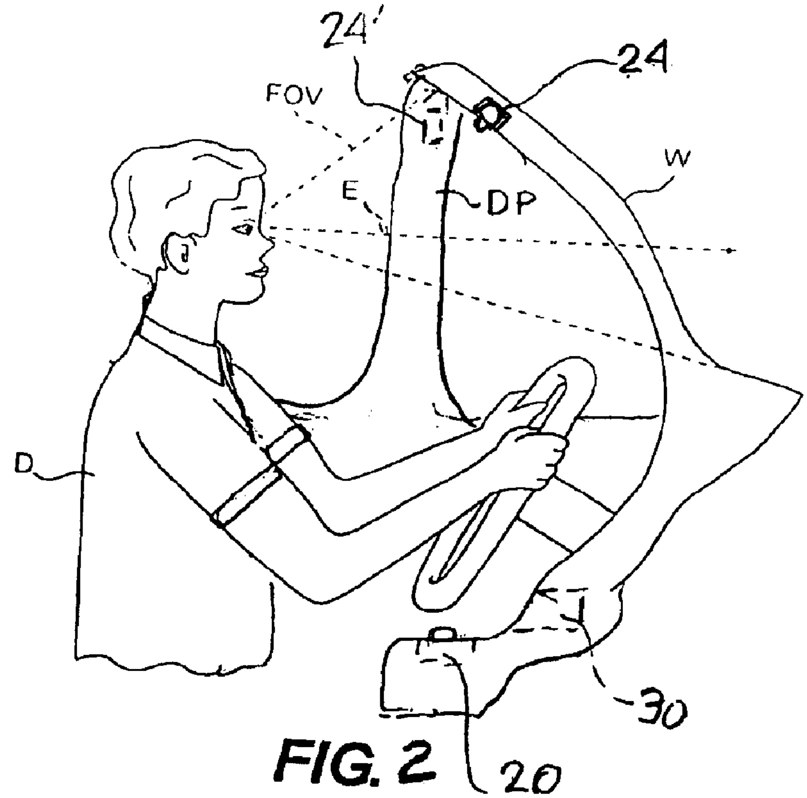
FIG. 2 is a schematic side elevational view of a portion of a vehicle showing the arrangement of certain components of the system in accordance with one embodiment of the invention.

As indicated above, although the components of the device of the invention can be housed together as a single unit in a common housing as in our earlier patent, it may be preferable in the commercial system of the present invention to mount certain components separately. Referring to FIG. 2, a driver D is shown in a proper driving position, with eyes on the road ahead, as indicated by headed dashed line E representing the line of sight of the driver's eyes. In FIG. 2, the windshield is denoted W and the LED 24 is located in, on, or just above, the windshield. Further, in this embodiment, the reset button 20 is mounted in the vicinity of the gear shift lever (not shown) and the audio alarm unit 30 is located on the instrument panel. FIG. 2 also shows, in dashed lines, a further embodiment wherein the LED, which is denoted 24', is located on the driver side door post DP.

Figure 3:
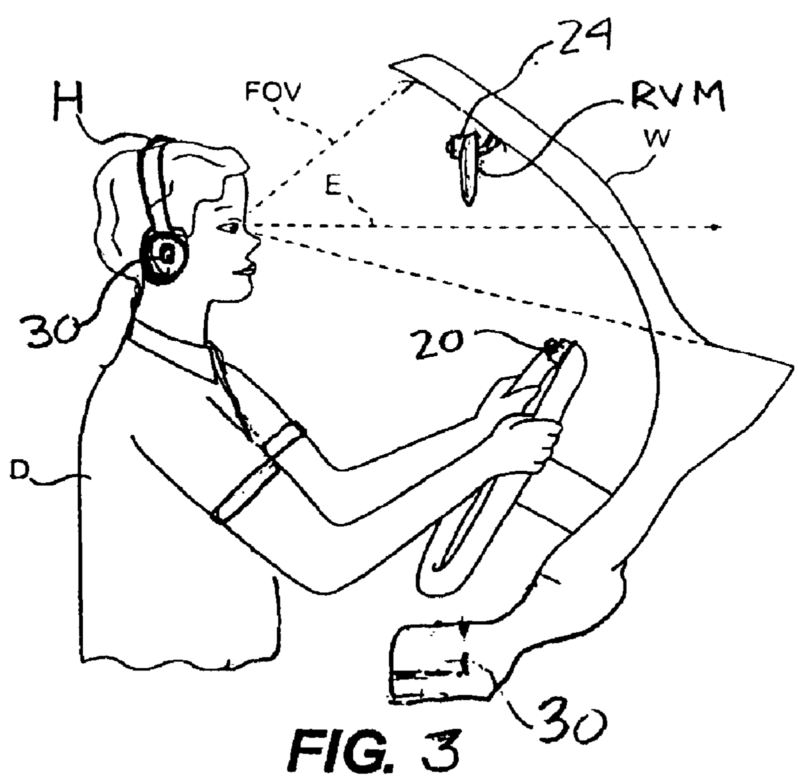
FIG. 3 is a schematic side elevational view similar to that of FIG. 2, showing the arrangement of the same components in accordance with a further embodiment of the invention.

In alternative embodiment shown in FIG. 3, LED 24 is located on the rear view mirror, indicated at RVM, while the reset switch 20 is located on the steering wheel and the alarm unit 30 is located in the vicinity of the shift lever.

It will be understood that there are other locations at which the various system components described above can be disposed, and that the various elements can be disposed in different combinations to provide arrangements other than those specifically illustrated in FIGS. 2 and 3.

Briefly considering some examples, as indicated above, the LED 24 can be located in the windshield W, on the windshield, above the windshield in the driver's cockpit, or on the internal rearview mirror, all as described above. In general, the only requirement or restriction is that the LED 24 be located in the upper periphery of the field of view of the driver.

Similarly, the audio alarm 30 can be located under the dashboard, in the driver door, in the dashboard, and in a number of other locations, and in addition can act through the radio. In general, the only restriction is that the alarm is preferably located relatively close to the driver so that the driver can clearly hear the audio signal produced thereby but, preferably, any passengers cannot.

In further examples, the reset button or switch 20 can be mounted on the steering column, in or on the steering wheel, at the location of the gear shift lever, in the mechanical controls at the driver's location (e.g., in the turn signal lever, brightness control lever, etc.) or in any other location that is easily reached by the vehicle operator.

The remainder of the system circuitry can be located with one of the three components, and in many applications is advantageously located with the audio alarm circuit. In the latter implementation, the auto alarm circuit is located on the same circuit board or on the same integrated circuit (IC) chip as the remaining circuitry of FIG. 1. More generally, the electrical system can be installed in any location on the vehicle at which access to the power source can be had, such as the vehicle trunk, engine compartment (with a suitable firewall), under the dash, in the lower cockpit and the like. In one important embodiment, the various components of the system are permanently installed or built in to the appropriate locations.

In an important alternative embodiment to the "built-in" embodiment, various signaling and control devices are disposed at various locations using wiring plug-ins. For example, the LED 24 can be attached at the appropriate location (i.e., in the peripheral field of vision of the driver or, more preferably, in the upper peripheral field of vision of the driver) using hooks and loops (VELCRO®) fasteners, glue, double sided tape and the like, with a wiring connection being made to the reset button or switch 20. The latter can be located as described above and mounted in a similar manner. Further, the alarm unit 30 could be similarly connected to the other components by suitable wiring.

As mentioned above and is illustrated in FIG. 3, the alarm unit 30 can also be mounted in a wearable audio signal receiving device, e.g., an ear-piece or headphones, as indicated at 16, rather than being a build-in unit or in addition to a built-in alarm unit. As stated previously, this feature provides a more private alarm capability wherein the driver can hear the audio alarm but any passengers cannot and hence will not be disturbed or upset by the audio alarm. As indicated hereinabove, this feature can be of particular importance for tour busses and the like, and in situations where the ambient noise might mask the audio alarm.

Briefly summarizing the operation of device 10, the lamp indicator (LED) 24 of the invention is to be positioned at a suitable location in the vehicle as described above and, preferably at the upper edge of the window of vision or field of view of a properly positioned driver. The small, preferably red, LED 24 illuminates to indicate "power on" when power is supplied to device 10 in the manner described above and preferably in response to engine starting. Immediately after such power activation, the reset switch 20, which is preferably a protruding red push button, must be pressed so that the illuminated red LED 24 is turned off. Led 24 acts thereafter as the driver testing light for the device 10.

In the latter regard, the red LED 24 is controlled by the built-in timer circuit 42 and after being initially turned off at the beginning of the sequence, is automatically illuminated every 15 minutes or other predetermined period of time. The driver will acknowledge this by pressing the protruding red push button 20 within a short period (e.g., 7 seconds) after illumination. If the red push button 20 is not pressed, the alarm 30 will sound until the red push button 20 is pressed. Once the alarm 30 sounds, the timed cycle will be automatically reduced to a predetermined period, e.g., 1 to 5 minutes because the control circuit detects that the driver missed the illuminating of the red LED 24.

As noted above, in common with our earlier patent, LED 24 is preferably positioned at the top of the driver's window of vision or field of view and illumination thereof will typically be missed because the head of the driver was tilted down or the eyelids slightly closed as a result of fatigue or drowsiness. The device of the invention detects such a condition and alerts the driver.

Finally, it is noted that the alarm signal or an indication that the alarm unit 30 has been activated can be relayed to alert supervisory personnel to the possible onset of driver fatigue. This can be done in several ways including through the use of the Global Positioning System (GPS).

Although the invention has been described above in relation to preferred embodiments thereof, it will be understood by those skilled in the art that variations and modifications can be effected in these preferred embodiments without departing from the scope and spirit of the invention.

What is claimed is:

1. A device for alerting a driver of a motorized vehicle as to the onset of fatigue, said device comprising:

an indicator lamp affixed to a part of the vehicle located in the upper periphery of the field of vision of the driver, so as to be viewable by the driver in the upper periphery of the field of vision of the driver, an electrical control circuit for controlling illumination of said indicator lamp so as to provide illumination thereof after passage of a predetermined time interval, a driver controlled reset switch for providing resetting of said time interval upon depression thereof by the driver;

alarm means for producing an alarm signal when said indicator lamp has been illuminated after the passage of said predetermined time interval and said reset switch has not been depressed after passage of a further predetermined time period, automatic deactivation means for sensing a first characteristic of a first parameter related to vehicle operation and for deactivating said control circuit so as to prevent illumination of said indicator lamp by said control circuit responsive to sensing said characteristic; and automatic activation means for sensing a further characteristic of a parameter related to vehicle operation and for activating said control circuit so as to enable illumination of said indicator lamp by said control circuit responsive to sensing said further characteristic, wherein the vehicle includes vehicle brakes having applied and non-applied braking states, wherein said first parameter is the braking state of the brakes and wherein said first characteristic is whether the brakes are in the applied state.

2. A device for alerting a driver of a motorized vehicle as to the onset of fatigue, characterized by a condition wherein the eyes of a driver are not directed straight ahead onto the road, said device comprising:

an indicator lamp affixed to a part of the vehicle located in the upper periphery of the field of vision of the driver, so as to be viewable by the driver in the upper periphery of the field of vision of the driver, an electrical control circuit for controlling illumination of said indicator lamp so as to provide illumination thereof after passage of a predetermined time interval, a driver controlled reset switch for providing resetting of said time interval upon depression thereof by the driver;

alarm means for producing an alarm signal when said indicator lamp has been illuminated after the passage of said predetermined time interval and said reset switch has not been depressed after passage of a further predetermined time period, and automatic control means for sensing a characteristic of a parameter related to vehicle operation and for preventing illumination of said indicator lamp by said control circuit responsive to sensing said characteristic, the vehicle including vehicle brakes having applied and non-applied braking states, and said parameter being the braking state of the brakes and said characteristic being whether the brakes are in the applied state.

3. A device for alerting a driver of a motorized vehicle as to the onset of fatigue, said device comprising:

an indicator lamp affixed to a part of the vehicle located in the upper periphery of the field of vision of the driver, so as to be viewable by the driver in the upper periphery of the field of vision of the driver, an electrical control circuit for controlling illumination of said indicator lamp so as to provide illumination thereof after passage of a predetermined time interval, a driver controlled reset switch for providing resetting of said time interval upon depression thereof by the driver;

alarm means for producing an alarm signal when said indicator lamp has been illuminated after the passage of said predetermined time interval and said reset switch has not been depressed after passage of a further predetermined time period, automatic deactivation means for sensing a first characteristic of a first parameter related to vehicle operation after the vehicle is in operation and for deactivating said control circuit so as to prevent illumination of said indicator lamp by said control circuit responsive to sensing said characteristic; and automatic activation means for sensing a further characteristic of a parameter related to vehicle operation after the vehicle is in operation and for activating said control circuit so as to enable illumination of said indicator lamp by said control circuit responsive to sensing said further characteristic, said device further comprising means for delivering a warning signal to a remote location in response to an alarm signal being produced.

4. A device as claimed in claim 3 wherein said first parameter is vehicle speed and wherein said first characteristic is whether the vehicle speed is below a predetermined speed.

5. A device as claimed in claim 3 wherein said first parameter is driveshaft r.p.m. and said first characteristic is whether the driveshaft r.p.m. is below a predetermined speed.

6. A device as claimed in claim 3 wherein said further parameter comprises vehicle cruise control status and said further characteristic is whether the vehicle cruise is in an actuated status.

7. A device as claimed in claim 3 wherein said further parameter comprises vehicle speed and said further characteristic is whether the vehicle speed is above a predetermined speed.

8. A device as claimed in claim 7 wherein said automatic activation means also senses whether the vehicle speed has exceeded a predetermined speed for a predetermined time period and, if so, enables illumination of said indicator lamp by said control circuit.

9. A device as claimed in claim 3 wherein said indicator lamp comprises a light emitting diode, and wherein said light emitting diode is affixed to a different part of the vehicle from said reset switch and said alarm means.

10. A device as claimed in claim 9 wherein said reset switch and said alarm means are also located at different parts of the vehicle.

11. A device as claimed in claim 3 wherein said device further comprises a wearable audio signal receiving device for receiving said alarm signal.

12. A device as claimed in claim 3 wherein said warning signal is delivered through a Global Positioning System.

13. A device for alerting a driver of a motorized vehicle as to the onset of fatigue, said device comprising:

an indicator lamp affixed to a part of the vehicle located in the upper periphery of the field of vision of the driver, so as to be viewable by the driver in the upper periphery of the field of vision of the driver, an electrical control circuit for controlling illumination of said indicator lamp so as to provide illumination thereof after passage of a predetermined time interval, a driver controlled reset switch for providing resetting of said time interval upon depression thereof by the driver;

alarm means for producing an alarm signal when said indicator lamp has been illuminated after the passage of said predetermined time interval and said reset switch has not been depressed after passage of a further predetermined time period, automatic deactivation means for sensing a first characteristic of a first parameter related to vehicle operation after the vehicle is in operation and for deactivating said control circuit so as to prevent illumination of said indicator lamp by said control circuit responsive to sensing said characteristic; and automatic activation means for sensing a further characteristic of a parameter related to vehicle operation after the vehicle is in operation and for activating said control circuit so as to enable illumination of said indicator lamp by said control circuit responsive to sensing said further characteristic, said device further comprising recording means, including first and second counters, for recording, during a predetermined time period, a first count of the number of times that the indicator lamp is illuminated and a second count of the number of times that an alarm signal is produced.

14. A device as claimed in claim 13 further comprising means for retrieving said first and second counts and resetting said first and second counters.

* * * * *